Patented June 17, 1941

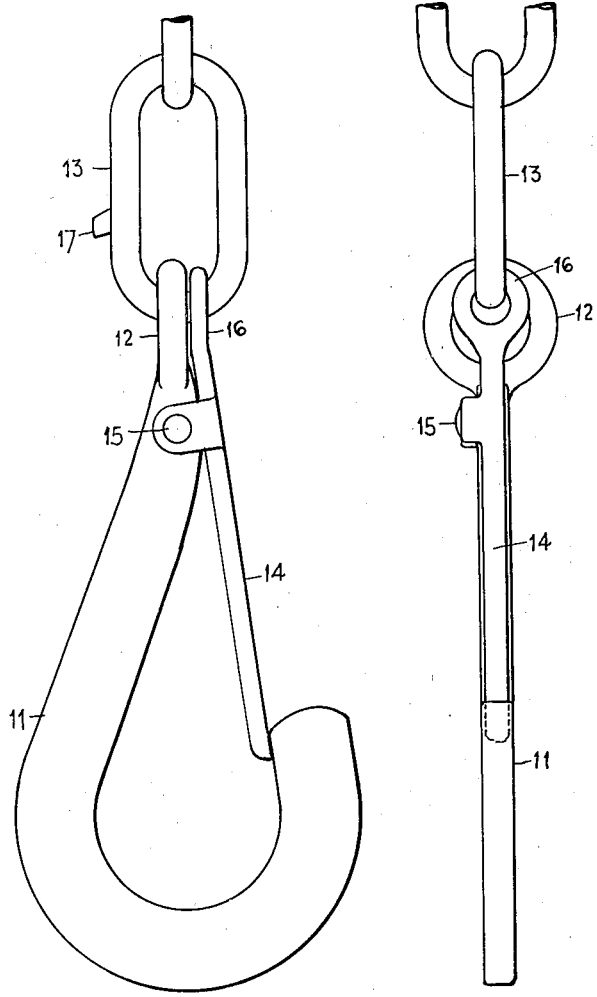
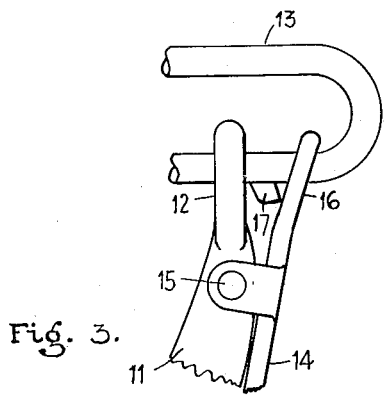

2,246,212

UNITED STATES PATENT OFFICE 2,246,212

SAFETY HOOK

John Michael Lavin, Los Angeles, Calif., assignor to Twentieth Century-Fox Film Corporation, Los Angeles, Calif., a corporation of New York Application March 4, 1940, Serial No. 322,047

2 Claims. (Cl. 24—242)

This invention relates to hooks such as are used on ropes, chains, cables and the like and deals with an improved safety lock on such hooks.

An object of the invention is to provide a simple, inexpensive keeper for hooks of the above nature wherein no springs or other small mechanisms likely to become out of order are used. Another object of the invention is to provide a safety hook wherein the keeper becomes effective as soon as any strain is put upon the hook. A further object of the invention is to provide a keeper for hooks that may be mounted upon any conventional hook with minor alterations. Still another object of the invention is to provide a safety hook wherein the keeper may be released only when there is no load upon the hook. Other objects and advantages will become apparent as the description proceeds in conjunction with the drawing, in which:

Figure 1 is a side view of a hook showing how my invention may be applied;

Figure 2 is a view of the same at right angles to Figure 1; and

Figure 3 is a fragmentary view showing how the keeper may be released.

Briefly stated, the invention amounts to incorporating a load actuated keeper upon a conventional hook, said keeper being pivotally mounted on the hook body and having an eyelet extending into the hook supporting means similar to the eyelet on the hook so that any strain put upon the hook will force the two eyelets together to actuate the keeper. Under this arrangement the load acts as the force for holding the keeper in place and the keeper may be released only when there is no load upon the hook.

In Figure 1, I have shown a conventional hook 11. The type, size and shape of the hook is unimportant. The hook 11 has the usual eyelet 12 for attaching to any means such as a chain having a link 13, or the attaching means may be a cable, rope, etc., having a loop in the end. The keeper means comprises a finger 14, adapted to close the opening into the hook, pivotally mounted upon the hook as shown at 15. The finger 14 also has an eyelet 16 adapted to register with the eyelet 12 of the hook and is mounted upon the same carrying means 13 as the hook eyelet. The shape of the keeper 14 is unimportant and the manner in which it is mounted upon the hook 15 is likewise unimportant, the only requirement being that the keeper is pivotally mounted upon some part of the hook so as to allow the finger 14 to swing to open and close the opening into the hook. As will be observed in Figure 1, the eyelets 12 and 16 are forced together in the bottom of the link 13 and the finger 14 is forced outwardly to close the opening into the hook. This would be the position when there is a load placed upon the hook and it is evident that the finger 14 cannot be released so long as the link 13 is in the position shown. In Figure 3, I have shown a fragmentary view which illustrates how the finger 14 may be released. Here it will be observed the link 13 is turned sideways and is worked through the eyelet 12, thus bringing the lug 17, carried by the link 13, into contact with the eyelet 16, whereupon the finger 14 is swung upon its pivot 15, thereby opening the hook. In Figure 2, it can be seen that the eyelet 12 is large enough to pass the lug 17, whereas the eyelet 16 will not pass the lug. By referring to Figure 1, it is obvious that the load upon the hook forces the finger 14 to close the hook opening, and in Figure 3 it can be seen that the only time that the safety finger 14 may be released is when there is no load upon the hook.

A safety device of the above nature may be mounted upon any type of hook, whether it be round or flat stock, and will function as a keeper without the use of springs or other mechanisms which are apt to get out of order.

I claim:

1. A safety hook comprising: a hook shaped member having a shank terminating in an eyelet, a keeper pivotally mounted on said shank, said keeper having an eyelet adapted to register with said first mentioned eyelet, a hook supporting member passing through both of said eyelets adapted to force said eyelets together and swing said keeper on its pivot point to close the hook opening when a strain is placed upon said hook, and a lug upon said supporting member adapted to pass through said eyelet on said shank and to engage said eyelet on said keeper to swing said keeper to release the same.

2. A safety hook comprising a hook having an eyelet, a keeper having an eyelet pivotally mounted on said hook, a supporting member passing through both of said eyelets adapted to force said eyelets together to actuate said keeper when a strain is placed upon said hook, and means on said supporting member arranged to pass through said hook eyelet and engage said keeper eyelet for releasing said keeper.

JOHN MICHAEL LAVIN.